(12) United States Patent
Steenhof et al.

(10) Patent No.: US 9,481,506 B2
(45) Date of Patent: Nov. 1, 2016

(54) ASSEMBLY AND METHOD FOR PREPARING A BEVERAGE

(71) Applicant: KONINKLIJKE DOUWE EGBERTS B.V., Utrecht (NL)

(72) Inventors: Vincent Jan Steenhof, 's-Hertogenbosch (NL); Joseph Theodoor Knitel, Utrecht (NL)

(73) Assignee: Koninklijke Douwe Egberts B.V., Utrecht (NL)

(*) Notice: Subject to any disclaimer, the term of this patent is extended or adjusted under 35 U.S.C. 154(b) by 0 days.

(21) Appl. No.: 13/865,831

(22) Filed: Apr. 18, 2013

(65) Prior Publication Data

US 2013/0224345 A1 Aug. 29, 2013

Related U.S. Application Data

(63) Continuation of application No. 11/814,552, filed as application No. PCT/NL2006/000037 on Jan. 24, 2006, now Pat. No. 8,425,957.

(30) Foreign Application Priority Data

Jan. 24, 2005 (NL) ...................... 1028101

(51) Int. Cl.
B65D 85/804 (2006.01)
A23F 5/26 (2006.01)
A23F 3/32 (2006.01)
A23F 5/12 (2006.01)

(52) U.S. Cl.
CPC ............. *B65D 85/8043* (2013.01); *A23F 3/32* (2013.01); *A23F 5/125* (2013.01); *A23F 5/262* (2013.01); *A23F 5/267* (2013.01); *B65D 85/8046* (2013.01)

(58) Field of Classification Search
CPC ............. B65D 85/8043; B65D 85/804; B65D 85/8046; A23F 5/262; A23F 5/267; A23F 2200/00; A23F 5/125; A23F 3/32
USPC .......................... 426/78, 433, 435, 432, 436
See application file for complete search history.

(56) References Cited

U.S. PATENT DOCUMENTS 1,951,357 A 3/1934 Hall
5,043,172 A 8/1991 Loizzi (Continued)

FOREIGN PATENT DOCUMENTS

| EP | 0813816 A | 12/1997 |
| EP | 0 878 158 | 11/1998 |
| EP | 0756844 | 5/1999 |
| EP | 1 317 199 | 6/2003 |
| EP | 1 317 200 | 6/2003 |
| GB | 1204900 | 9/1970 |

(Continued)

OTHER PUBLICATIONS

International Search Report for International Application No. PCT/NL2006/000037, mail date May 3, 2006, 3 pages.

*Primary Examiner* — Anthony Weier
(74) *Attorney, Agent, or Firm* — Foley & Lardner LLP

(57) ABSTRACT

The invention relates to an assembly for preparing a beverage suitable for consumption. To that end, the assembly is provided with at least a first covering and a first ingredient included in the at least first covering, the first ingredient having a substance such as milk powder/creamer, sugar and like additives soluble or extractable in a liquid such as water. The assembly is further provided with a second ingredient, the second ingredient having a soluble or extractable substance such as ground coffee or tea while the second ingredient forms part of a substantially rigid body.

12 Claims, 4 Drawing Sheets

(56) References Cited

U.S. PATENT DOCUMENTS

| | | |
|---|---|---|
| 5,477,775 A | 12/1995 | Delhom et al. |
| 5,518,743 A | 5/1996 | Pergola et al. |
| 6,004,593 A | 12/1999 | Soughan |
| 2004/0197444 A1 | 10/2004 | Halliday et al. |
| 2005/0076783 A1 | 4/2005 | Kodden et al. |

FOREIGN PATENT DOCUMENTS

| | | |
|---|---|---|
| WO | WO 96/05736 | 2/1996 |
| WO | WO-03/105642 | 12/2003 |
| WO | WO 2004/018326 A | 3/2004 |
| WO | WO 2004/065256 | 8/2004 |
| WO | WO 2004/071899 | 8/2004 |
| WO | WO 2006/043098 | 4/2006 |
| WO | WO 2008/148650 | 12/2008 |

ASSEMBLY AND METHOD FOR PREPARING A BEVERAGE

CROSS-REFERENCE TO RELATED PATENT APPLICATIONS

This application is a continuation of application Ser. No. 11/814,552, which is the national phase of International Application No. PCT/NL2006/000037, filed Jan. 24, 2006, now U.S. Pat. No. 8,425,957 which claims priority to Netherlands Application No. 1028101, filed Jan. 24, 2005. All of these applications are incorporated herein by reference in their entireties.

BACKGROUND OF THE INVENTION

The invention relates to an assembly for preparing a beverage suitable for consumption, provided with a supply side for supplying, during use, a liquid to the assembly, and a discharge side for discharging, during use, the beverage suitable for consumption of the assembly, further provided with a first covering and a first ingredient included in the first covering, the first ingredient comprising a substance such as milk powder/creamer, sugar and like additives, soluble or extractable in the liquid such as water, while the assembly is further provided with a second ingredient, the second ingredient comprising a substance, such as ground coffee or tea, soluble or extractable in a liquid.

Such an assembly is known from international patent application WO 04/018326. The known assembly is intended for use in a machine known per se, such as a coffee machine, for preparing the beverage suitable for consumption. Here, the assembly is placed in a holder of the machine after which hot water is supplied to the holder by means of the machine. Thereupon, the hot water flows through a top filter sheet to an inner space of the covering in which an extractable substance is present. The extract formed here then flows to an inner space located therebeneath in which the water-soluble substance is present. This substance dissolves in the extract and then leaves the assembly via a lower filter sheet. Here, the holder is provided with at least one outflow opening through which the water with the substance dissolved therein can flow from the holder.

A drawback of the known assembly is that it is less suitable for dissolving and/or extracting in the liquid at least two mutually different ingredients which are both included in the assembly and which, preferably, should substantially not be dissolved or extracted in the same volume of liquid, or not at the same moment or in the same manner, since the liquid is presented to both ingredients in an identical manner and substantially at the same time.

SUMMARY

One object of the invention is to provide an assembly with which at least two mutually different ingredients, both present in the assembly can be dissolved and/or extracted in the liquid at mutually different moments or in mutually different manners.

To that end, the assembly according to the invention is characterized in that the second ingredient forms part of at least one substantially rigid body. It appears that with the features according to the invention, that is to say the provision of the second ingredient in the at least one substantially rigid body, it is possible to ensure that the moments at which the two ingredients dissolve and/or are extracted and/or the extent to which the two ingredients dissolve and/or are extracted are rendered substantially independent from each other in a simple manner.

In use, the assembly according to the invention is placed in a holder known per se. Then, an amount of liquid is supplied to the assembly. The liquid will act upon the first ingredient, while the first ingredient can directly dissolve or be extracted in the supplied liquid. The liquid will also act on the second ingredient. However, primarily, the liquid will only act on an outer surface of the substantially rigid body, so that the second ingredient cannot be dissolved or extracted in an efficient manner. Herein, rigid body is understood to mean a body which, as long as it is not exposed to the liquid, is substantially form-retaining Here, a relatively stiff element can, for instance, be considered such as a slab of compressed, ground coffee or a lump of sugar or a body of a clay-like substance deformable in itself.

The liquid can flow through, for instance, a free space along the substantially rigid body between the holder and the substantially rigid body or, in a special embodiment, through holes in the substantially rigid body, from the supply side to the discharge side. Thus, the liquid with the first ingredient dissolved or extracted therein, and the second ingredient hardly dissolved or extracted therein will leave the assembly and the holder and be supplied to, for instance, a mug. Only after some time, under the action of the liquid, the substantially rigid body will for instance soften, swell, disintegrate and/or otherwise loose its form-retaining property, whereupon dissolution and/or extraction of the second ingredient can take place in an efficient manner. Therefore, dissolving or extracting the second ingredient actually begins later than the dissolution or extraction of the first ingredient. In this manner, the liquid with the second ingredient dissolved or extracted therein, and, optionally the first ingredient dissolved or extracted therein will then leave the assembly and be supplied to, for instance, a mug.

In the case the second extract comprises the substance to be extracted, the shape or dimension of the substantially rigid body can change due to the substantially rigid body, for instance softening, swelling or disintegrating. As a result, the free space between the substantially rigid body and the holder can, for instance, be filled up, so that the liquid may no longer flow along the substantially rigid body or, in a special embodiment, the holes in the substantially rigid body can be closed. Thus, the liquid can flow, for instance under pressure, through the substance to be extracted thereby extracting the substance to be extracted. In the case the second ingredient comprises the soluble substance, the shape or dimension of the substantially rigid body can change too, so that the liquid can no longer flow along the substantially rigid body or, in a special case, the holes in the substantially rigid body can be closed. Thus, the liquid can flow through the soluble substance thereby dissolving the soluble substance. During dissolution of the second ingredient, at least a part of the second ingredient disappears from the assembly, so that it is also possible that the liquid can, at least temporarily, no longer flow along the substantially rigid body or, in the special case, the holes in the substantially rigid body are at least temporarily closed.

A possible example is the following. The first ingredient comprises a soluble substance, namely milk powder/creamer. The second ingredient comprises a substance to be extracted, namely ground coffee. The ground coffee forms part of a substantially rigid body, in this example a compressed cake or ground coffee. The assembly comprising the first and the second ingredient is placed in a holder known per se. Then, hot water is supplied to the assembly. During a first period, the hot water will dissolve the milk powder/ creamer. During the first period, the hot water can hardly, if at all, extract the ground coffee as the water cannot flow through the ground coffee forming part of the cake. The water with the milk powder/creamer dissolved therein will flow along the cake, through, for instance, a space between the cake and the holder or, in a special embodiment, through holes in the cake, from the supply side to the discharge side, and be dispensed in, for instance, a mug. After some time due to, for instance, the action of the water, the temperature and/or the pressure, the cake can for instance soften, swell, tear, disintegrate and/or otherwise loose it form-retaining property. Thus, in this example, the space between the cake and the holder, or, in the special embodiment the holes, can be closed. Then, during a second period, the water can flow through the ground coffee, in this example under pressure, thereby extracting the coffee. The water with coffee extract therein, and, optionally, dissolved milk powder/creamer, can be dispensed to the mug. In this example therefore, it is possible that during the first period, chiefly, milk powder/creamer dissolved in the water is dispensed and, during the second period, chiefly, coffee extract is dispensed. Here, milk powder/creamer dissolved in water and the coffee extract can be combined in a manner such that they mix well. However, it is also possible that the milk powder/creamer dissolved in water and the coffee extract are combined such that they do no mix well, for preparing, for instance, cappuccino where foamed milk is present on top of the coffee extract. To this end, the beverage can further be supplied to an apparatus described in the European patent application EP 0878158, EP 1317199 or EP 1317200, or in international patent application WO 2003/105642, and with the aid of which air is whipped into the beverage for obtaining a fine-bubble froth layer on the beverage. The thus obtained beverage is then, for instance, a cappuccino ready for consumption. The beverage may also be supplied to other known apparatus for undergoing further operations.

The invention also relates to a rigid body designed for use in the assembly according to the invention.

The invention further relates to a pad provided with the rigid body of the assembly according to the invention.

The invention further relates to a method for preparing a beverage suitable for consumption with an assembly according to any one of the claims, wherein the assembly is placed in a holder which is provided with an inflow opening for a liquid, such as water, and an outflow opening for the beverage, and wherein a liquid such as hot water is supplied, under pressure, to the inflow opening of the holder, in particular from an upper side thereof so that the water flows from the supply side through the assembly for obtaining the beverage, whereupon the beverage leaves the assembly via the discharge side and whereafter the beverage is dispensed via at least one discharge opening of the holder. The obtained beverage can then be led through a discharge opening designed as a nozzle in a manner such that a fine-bubble froth layer is obtained. As already described in the foregoing, such a method with a nozzle is particularly suitable for obtaining cappuccino.

With reference to the embodiments represented in the drawing, albeit exclusively by way of non-limitative examples, the invention will presently be further elucidated.

BRIEF DESCRIPTION OF THE DRAWINGS

FIG. 8b is a top plan view of the assembly according to FIG. 8a.

DETAILED DESCRIPTION OF EXEMPLARY EMBODIMENTS

Figure 1A:
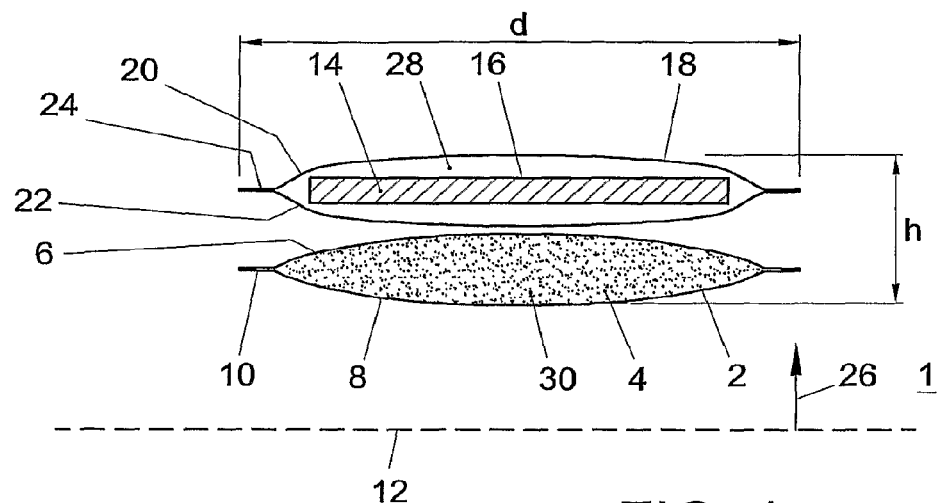
FIG. 1a shows a cross-section of a first embodiment of an assembly according to the invention.

In FIG. 1 with reference numeral 1 is indicated an assembly for preparing a beverage suitable for consumption according to the invention. The assembly is provided with a supply side for supplying, during use, a liquid to the assembly, and a discharge side for discharging, during use, the beverage suitable for consumption of the assembly. The assembly 1 is provided with at least a first covering 2 in which is included a first ingredient, in this example a water-soluble substance 4. In this example, the water-soluble substance comprises milk powder/creamer. Other soluble substances such as sugar, odorants, colorants, flavorings or powders for preparing cocoa and other beverages suitable for consumption, or extractable substances are also conceivable. Also, substances in other forms than powder-form are possible, such as concentrates and extracts.

The first covering 2 comprises a top sheet 6 manufactured from sheet-shaped filter material, located, in this example, at the supply side of the assembly, and a bottom sheet 8 manufactured from sheet-shaped filter material, located, in this example, at the discharge side of the assembly. In this example, the top sheet 6 and the bottom sheet 8 are each manufactured from filtering paper. However, other filter materials such as filter materials of a plastic are possible too. In this example, the bottom sheet 8 and the top sheet 6 of the first covering 2 are interconnected at their circumferential edges, whereby the interconnected parts form a connecting seam 10. The top sheet 6 and the bottom sheet 8 of the first covering 2 each extend, at least partly, substantially parallel to a plane 12.

The assembly 1 is further provided with a second ingredient, in this example a substance 14 to be extracted. In this example, the substance to be extracted consists of ground coffee. Other substances to be extracted such as for instance tea, or soluble substances are also conceivable. The substance to extract forms part of a substantially rigid body. In this example, the ground coffee is compressed into a substantially form-retaining, hard, round disc 16. The disc 16 is included in a second covering 18. The second covering 18 also comprises a top sheet 20 manufactured from sheet-shaped filter material and a bottom sheet 22 manufactured from a sheet-shaped filter material. In this example, the top sheet 20 and the bottom sheet 22 are each manufactured from filtering paper. However, other filter materials are possible too, such as filter materials of a plastic. In this example, the bottom sheet 22 and the top sheet 20 of the second covering 18 are interconnected at their circumferential edges, whereby the interconnected parts form a connecting seam 24. The substantially rigid body, the top sheet 20 and the bottom sheet 22 of the second covering 18 extend, each at least partly, substantially parallel to the plane 12. The substantially rigid body extends therefore substantially parallel to the first covering 2. The second ingredient extends substantially parallel to the first ingredient. In this example, the first and second ingredient, that is to say, the substance to extract and the soluble substance, are separated from each other by the sheets 6 and 22.

Further, it holds that the assembly 1 has a flat shape while in the direction of the plane 12 the assembly has greater dimensions than in a direction 26 perpendicular to the plane 12. The substantially rigid body preferably has a cross-section in the plane 12 which is preferably equal to 75-18000 mm$^2$, more preferably 1200-5000 mm$^2$. The height h of the assembly is, for instance, 6-20 mm, in particular approximately 7 mm.

Figure 1B:
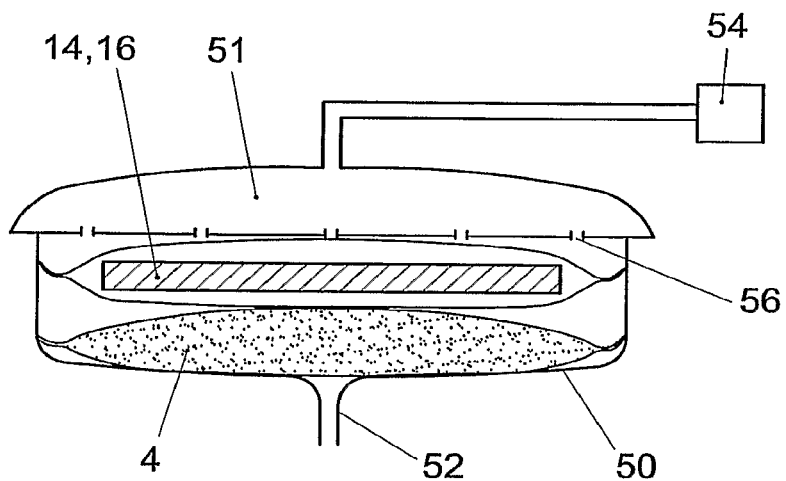
FIG. 1b schematically shows a cross-section of the assembly according to FIG. 1a in an apparatus for preparing a beverage.
Figure 1C:
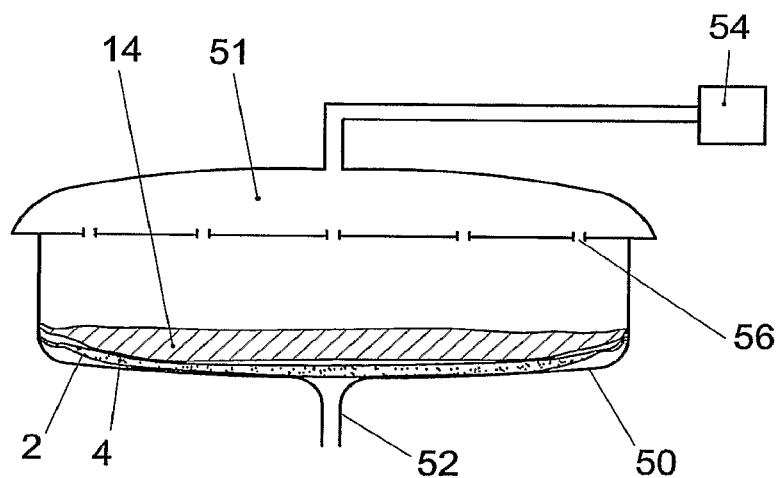
FIG. 1c schematically shows a cross-section of the assembly according to FIG. 1a in an apparatus for preparing a beverage.

The assembly 1 can be used as follows for preparing a beverage suitable for consumption while utilizing auxiliary means known per se (see FIG. 1*b*). The assembly may be placed in a holder 50 which is provided at its upper side with a lid 51 and which is provided at its bottom side with at least one outflow opening 52. Such holders 50 are known per se and are typically used with apparatus known per se for preparing a beverage suitable for consumption such as espresso machines and other types of apparatus. With the aid of a hot water unit 54 of the apparatus, for instance hot water can be supplied under pressure to the lid 51. The lid is provided at its underside with a number of outflow openings 56 via which the hot water is then supplied to an upper side of the holder 50. At the supply side, this hot water enters an inner space 28 of the second covering. The water also flows around, for instance, the rigid body via a space between the rigid body, in this example the disc 16, and the holder, into an inner space 30 of the first covering 2 of the assembly 1, whereby the soluble substance 4 dissolves in the water. The flowing of the water around the rigid body can take place inside and outside the covering 18. The soluble substance 4 can then directly dissolve in the hot water. However, the substance 14 to extract forms part of the substantially rigid body, in this example the compressed, hard disc 16 of ground coffee. The at least one substantially rigid body may be formed by, for instance, compressing the substance (the ground coffee) to extract to 30-80% of the volume in non-pressed together condition, preferably to 40-70%, more preferably substantially 50%. As a result, in a simple manner, a compact, rigid body of substance to extract is formed. Initially, the water will only act on the outside surface of the rigid body and therefore not extract coffee in an efficient manner. After some time, under the action of the water and/or the pressure, the rigid body will soften, swell, tear, disintegrate and/or otherwise loose it form retaining property. Only then, the water can efficiently extract the coffee and begin to flow through the thus formed coffee bed while coffee extract is formed, so that extracting actually begins later than dissolving (see FIG. 1*c*). Then, the coffee extract will flow through the first covering 2. Therefore, initially, water and then, as described hereinabove, the coffee extract flows through an inner space 30 of the first covering 2, where the soluble substance 4 will dissolve in the water and/or the coffee extract whereby milk and/or coffee with milk, respectively, is formed. It is also possible that all milk powder has already dissolved when, still, coffee extract flows through the inner space 30 so that only coffee is formed. FIG. 1*c* shows that most of the milk powder has already dissolved. The milk and/or coffee with milk and/or coffee then flows from the assembly 1 at the discharge side via the bottom sheet 8 of the first covering 2. The milk and/or coffee with milk and/or coffee can thereupon leave the holder via the at least one outflow opening of the holder. Here, it holds that the assembly is placed in a holder which is provided with an inflow opening for a liquid such as water, and an outflow opening for the beverage, while then, a liquid such as hot water is supplied under pressure to the inflow opening of the holder, in particular from an upper side thereof, so that the water flows from the supply side through the assembly for obtaining the beverage whereupon the beverage leaves the assembly via the discharge side and whereafter the beverage is dispensed via at least one discharge opening of the holder. The beverage suitable for consumption leaving the holder can then be collected in a container such as a cup or a mug. However, it is also possible that the beverage is supplied from the holder to a nozzle for preparing a beverage suitable for consumption with a fine-bubble froth layer as described in, for instance, European patent application EP 878158. Here, the outflow opening of the holder can for instance be designed as the nozzle. Thus, cappuccino can be formed. Here, the outflow opening of the holder can be designed as the nozzle of the apparatus according to the European patent application mentioned. As initially, chiefly milk with a fine-bubble froth layer and, secondly, chiefly coffee with milk and/or coffee with a fine-bubble froth layer is supplied to the mug, cappuccino will be formed with at least a fine-bubble froth layer of milk (the froth layer of milk tends to float on the coffee with milk and/or the coffee). Connoisseurs appreciate cappuccino with a froth layer of milk more than cappuccino with a brown froth layer of coffee with milk.

Figure 2:
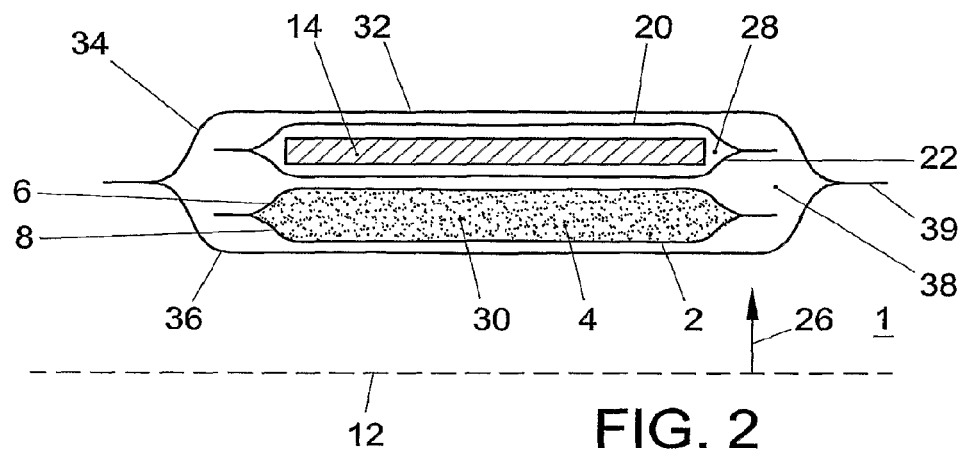
FIG. 2 shows a cross-section of a second embodiment of an assembly according to the invention.

FIG. 2 shows an alternative embodiment of the assembly 1 according to the invention. Here, the first covering 2 and the second covering 18 are both included in an inner space 38 of a third covering 32. In this example, the third covering 32 is provided with a top sheet 34 manufactured from sheet-shaped filter material such as filtering paper, and a bottom sheet 36 manufactured from sheet-shaped filter material such as filtering paper. The bottom sheet 36 and the top sheet 34 are interconnected at their peripheral edges. These peripheral edges form a circumferential connecting seal 39. In this example, the first covering 2 and the second covering 18 are held together by the third covering 32, and the first covering 2 and the second covering 18 are not necessarily directly interconnected. As in this embodiment, the assembly forms one whole it is not necessary, like in the embodiment shown in FIG. 1, to put together the assembly when placing in a holder. Like the assembly of FIG. 1, the assembly according to FIG. 2 may be used for preparing cappuccino or coffee with milk in, for instance, the apparatus according to FIG. 1*b*.

Figure 3:
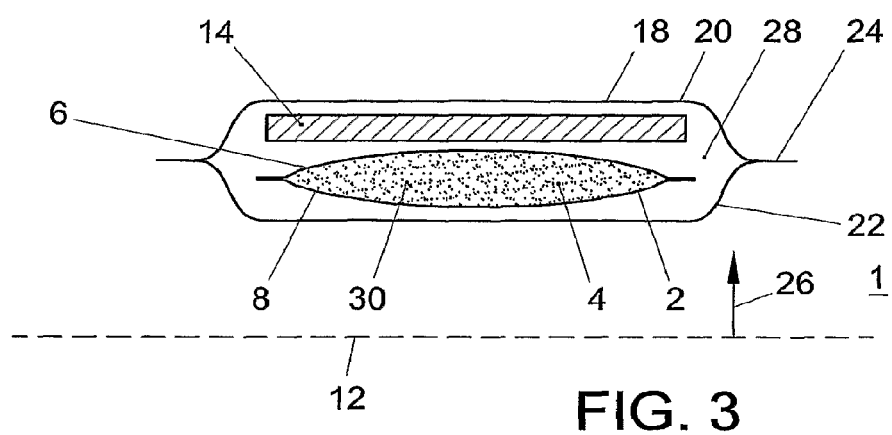
FIG. 3 shows a cross-section of a third embodiment of an assembly according to the invention.

FIG. 3 shows an alternative embodiment of the assembly 1 according to the invention. Here, the first covering 2 is included in the inner space 28 of a second covering 18. As is the case in the embodiment of FIG. 2, in this embodiment, the assembly forms one whole. The use may be as described with respect to FIG. 1.

Figure 4:
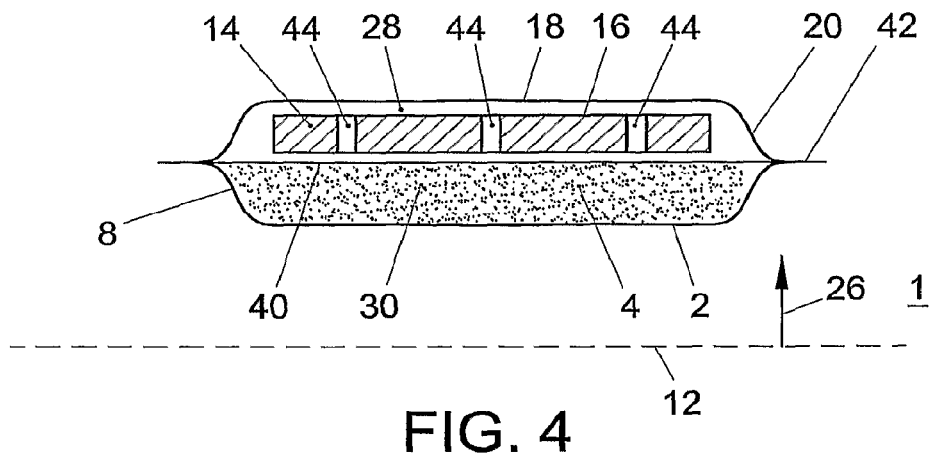
FIG. 4 shows a cross-section of a fourth embodiment of an assembly according to the invention.

FIG. 4 shows an alternative embodiment of the assembly according to the invention. In FIG. 4 too, the assembly 1 is provided with a first covering 2 in which is included a first ingredient, in this example a water-soluble substance 4, in this example milk powder/creamer, and with a second covering 18 manufactured from a sheet-shaped filter material such as filtering paper, in which is included a second ingredient, in this example a product to extract such as ground coffee or tea 14, in the form of a substantially rigid body 16. Here too, the second covering 18 extends above the first covering, at least substantially parallel to the plane 12. In this embodiment, the second covering is provided with the top sheet 20 and an intermediate sheet 40. Here, the intermediate sheet 40 also functions as top sheet of the first covering 2. The first covering is therefore provided with the intermediate sheet 40 and the bottom sheet 8. In this example, the top sheet 20, intermediate sheet 40 and bottom sheet 8 are, once more, manufactured from sheet-shaped filter material such as filtering paper. Naturally, the first covering 2 can be provided with a top sheet which is separate from the bottom sheet 22 of the second covering as discussed in FIGS. 1-3. In this example, the product to be extracted is designed as a round, flat disc 16 of compressed, ground coffee 14. In this example, the disc is provided with at least one through-flow opening, in this example a plurality of through-flow openings 44, extending through the disc in a direction 26 at right angles to the plane 12, from a first side to a second side, with the first side and the second side lying opposite each other, in this example from the supply side to the discharge side of the disc 16. The through-flow openings preferably have a (hydraulic) diameter in the range of 0.1-3 mm, more preferably of 0.2-1.4 mm. It is preferred that the disc is provided with a plurality of through-flow openings, preferably 1-4 through-flow openings per 10 $cm^2$ of a cross-section of the substantially rigid body 16 in the plane 12. The joint surface of the through-flow openings in the top surface of the disc, which extends in the direction of plane 12, is preferably, at most, 30% of the total surface of the top surface of the disc, more preferably 1-5%.

The assembly of FIG. 4 can, once more, be placed in, for instance, a holder known per se of, for instance, an espresso machine as described hereinabove with reference to FIG. 1. Then, hot water is supplied to an upper side of the holder, preferably under pressure. As the through-flow openings 44 extend through the substantially rigid body in a flow direction of the liquid, from the supply side to the discharge side of the assembly, the water will first flow through the through-flow openings in the disc 16. Substantially no coffee 14 is extracted then. Thus, the water is supplied to the first covering 2. In the example of FIG. 4, the hot water flows through the intermediate sheet 40 to the inner space 30 of the first covering 2 where the milk powder 4 is dissolved in the water. The solution of milk power in water then flows, at the outflow side, from the assembly 1 via bottom sheet 8 and can then leave the holder via the at least one outflow opening of the holder. As discussed hereinabove, the thus obtained solution can also be supplied to an apparatus for obtaining a beverage with a fine-bubble froth layer as described in, for instance, European patent application EP 0878158. Thus, a foamed milk can be formed for preparing cappuccino. As the milk powder has been dissolved in water in which substantially no coffee extract is present, the foamed milk will have a substantially white color.

When, for some time, for instance a few seconds, water is supplied to the second covering 18, the disc 16 of compressed, ground coffee 14 will begin taking up water. As a result, the disc may soften, swell, crumble or otherwise loose its form-retaining property, so that the through-flow openings 44 can close, for instance silt up with, for instance crumbling coffee particles. This prevents a free passage of the water to the first covering 2. Now, hot water will begin flowing through the formed coffee bed. In the second covering 18, coffee can now be extracted in an efficient manner. The coffee extract leaves the second covering 18 via the intermediate sheet 40 and then enters the first covering 2 because the intermediate sheet 40 also forms the top sheet of the first covering. In the first covering 2, the coffee extract flows through the inner space 30 where for instance virtually no milk powder 4 will have remained behind. Then, the coffee flows from the assembly 1 of FIG. 4 via the bottom sheet 8. Hereupon, the coffee can leave the holder via the at least one outflow opening of the holder. The coffee may also be supplied to the apparatus for obtaining the beverage with the fine-bubble froth layer. Thus, a foamed coffee (cafe cream) can be formed which is supplied to the white, foamed milk already formed. As the foamed milk tends to float on the coffee added afterwards, a cappuccino can be prepared with a white foam layer. The dimensions of the through-flow openings are chosen such, and the second ingredient is compressed such that in use, when the disc softens, swells, crumbles or its form-retaining property is otherwise reduced, in a predetermined period of time, for instance under the influence of the water at the presented pressure, the through-flow openings close, for instance silt up with coffee particles or be pressed shut by swelling of surrounding coffee particles. This period of time is chosen such that herein, a predetermined amount of the soluble substance can dissolve in the water. The total surface of the through-flow openings is chosen such that the period of time is preferably 1-10 seconds, more preferably 3-5 seconds. However, it is also conceivable that after the hot water has flown through the through-flow openings 44 for some time, the through-flow openings are closed in a different manner, for instance in that the through-flow openings are pressed shut in a mechanical manner.

Figure 5:
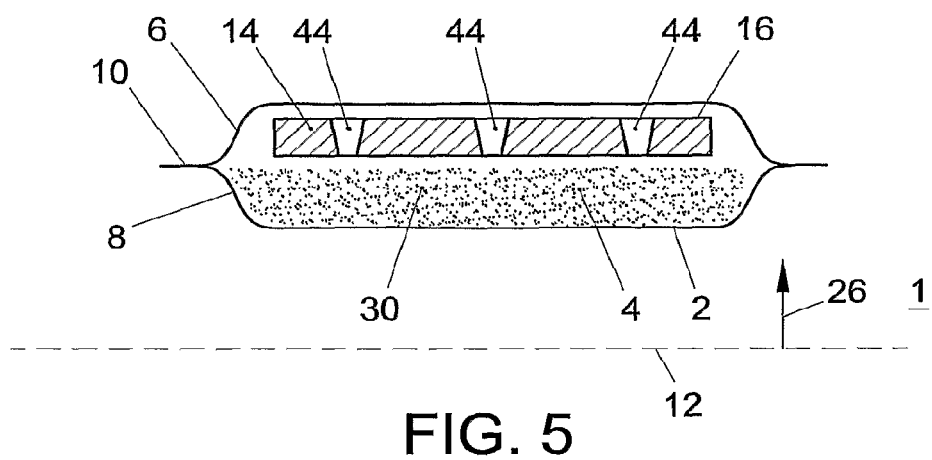
FIG. 5 shows a cross-section of a fifth embodiment of an assembly according to the invention.

FIG. 5 shows a special variant of the embodiment of FIG. 4. Here, the intermediate sheet 40 is omitted, so that, actually, the disc 16 of compressed, ground coffee 14 and the milk powder 4 are both present in the inner space 30 of the first covering 2. The use of the assembly according to FIG. 5 can be as described with reference to FIG. 4.

Figure 6:
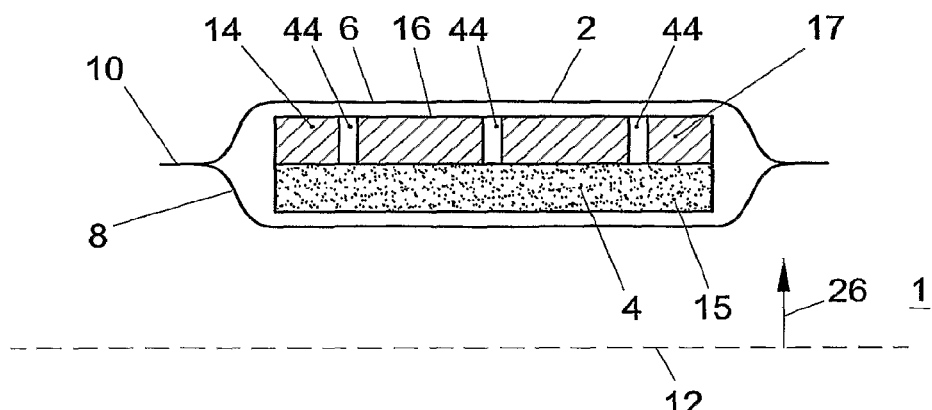
FIG. 6 shows a cross-section of a sixth embodiment of an assembly according to the invention.

FIG. 6 shows an alternative embodiment of the assembly 1 according to the invention. In the example of FIG. 6, the assembly comprises a first ingredient, in this example milk powder 4, and a second ingredient, in this example ground coffee 14. The second ingredient forms part of a substantially rigid body. In this example, the ground coffee 14 is compressed into a disc 16. In the example of FIG. 6, the first ingredient also forms part of the substantially rigid body. In the example of FIG. 6, the first ingredient forms part of a first body portion 15 and the second ingredient forms part of a second body portion 17 of the substantially rigid body. In FIG. 6, the second body portion is provided with through-flow openings 44. However, it is also possible that the second body portion 17 is not provided with through-flow openings and/or that the first body portion 15 is provided with through-flow openings. In this embodiment, it is possible to compress the substantially rigid body comprising the first body portion with the milk powder and the second body portion with the ground coffee in a manner such, and/or provide it with a surface structure or surface layer such that in use, either first, milk powder dissolves and then coffee is extracted, or, first coffee is extracted and then milk powder dissolves.

In the example of FIG. 6, the first and second ingredient have not been mixed but are separated from each other, however, it is also possible that in mixed form, the first and second ingredient form part of the substantially rigid body. It is also possible that the first ingredient forms part of a second substantially rigid body which is not connected to the substantially rigid body of which the second ingredient forms part. The variants described with reference to FIG. 6 can be used as described hereinabove for the variant according to FIGS. 1-5.

Figure 7:
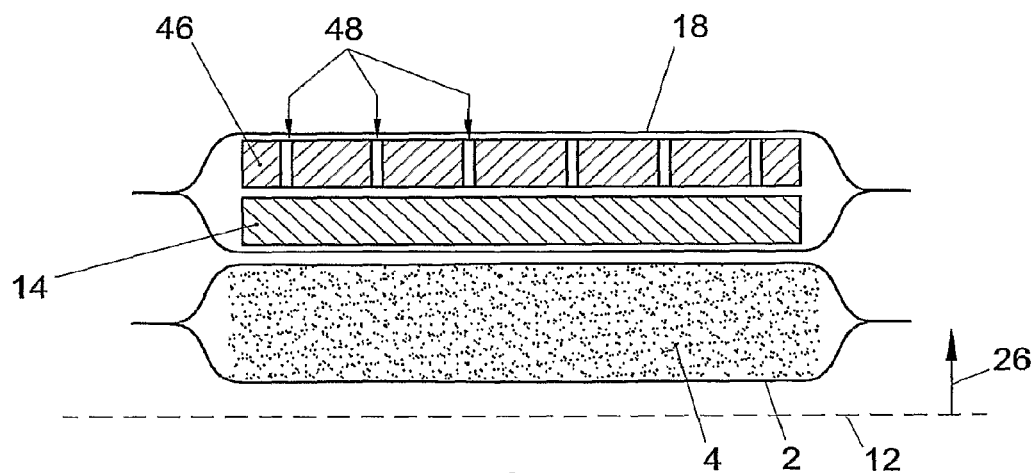
FIG. 7 shows a cross-section of a seventh embodiment of an assembly according to the invention.

FIG. 7 shows an alternative embodiment of the assembly according to the invention. In FIG. 7, the assembly 1 is further provided with a reinforcing body 46, which, by way of example, is designed as a disc of plastic or metal, provided with holes 48. The reinforcing body can also be manufactured from for instance cardboard, rubber and/or biodegradable material. The reinforcing body serves to prevent the disc 16 of compressed coffee from breaking. A crack in the disc may cause the passage of an unknown amount of water through the disc 16, without extraction of coffee, which may adversely affect the quality of the coffee brewed, or at least render it unreproducible.

The width over which the disc 16 and/or the second covering 18 of the assembly 1 from FIGS. 1-7 extend in cross direction B is preferably at least as great as, and, in the examples, corresponds to the width over which the soluble substance 4 and/or the first covering 2 extend in the direction of the plane 12. As a result, the first and the second covering 2, 18 can simply be included in the holder 50 which is provided with the at least one outflow opening 52. Here, the first covering rests on the bottom of the holder 54, while the second covering is positioned on top of the first covering (see FIGS. 1a, 1b, 8a and 8b). Thereupon, hot water can be supplied to the upper side of the holder for preparing the beverage suitable for consumption. In particular, the water is supplied under pressure. This pressure can take the usual values for preparing espresso or coffee with the Senseo system.

An additional advantage of the disc 16 of compressed, ground coffee 14 in the examples is that the substance to extract can be compressed such that under the influence/action of the water, the volume of the disc can increase, for instance expand or swell, while the volume of the soluble substance present in the first covering decreases because it dissolves and disappears from the first covering. The substance to extract can be compressed such that, under the action of the liquid, the substance to extract expands or swells to such an extent that the volume of the soluble substance disappearing through dissolution from the assembly is substantially filled up by the extractable substance. As a result, the extraction process is not uncontrollably influenced because a displacement and/or deformation of the assembly as a result of a deformation through volume decrease of the first covering hardly takes place, if at all. This holds not only when the second covering rests in the holder on the first covering, but also when the second covering is located in the holder below the first covering. In the examples, the substance to extract is designed as a disc, optionally provided with through-flow openings. However, it is also possible to design the substance to extract as at least two rigid bodies which bodies extend, for instance, substantially side by side in the direction of the plane 12. Here, an optionally predetermined intermediate space between the at least two rigid bodies can allow a liquid flow, for instance to the soluble substance or to the outflow opening. The intermediate space can then for instance be formed in that the at least two rigid bodies are provided with projections for maintaining a mutual distance. The intermediate space can also be formed in that a third body is located between the rigid bodies. The at least two rigid bodies can be compressed and/or designed such that the intermediate space is closed under the action of the liquid.

In the examples it is described that the beverage can be supplied from the holder to a nozzle for preparing a beverage suitable for consumption with a fine-bubble froth layer such as described in, for instance, European patent application EP 0878158, wherein a liquid jet squirts from the nozzle in a liquid surface. It is also possible to supply the beverage to alternative apparatus for generating a fine-bubble froth layer. Examples of these apparatus are described, inter alia, in European patent application EP 131799, wherein the liquid jet squirts into a buffer reservoir provided with a liquid flow decelerating barrier, and EP 1317200, wherein the liquid jet squirts to a roughened surface, and in international patent application WO 2003/105642, wherein the liquid jet squirts on a jet impact element with a top which is clear from an inner wall of a chamber in which the jet impact element is included. In addition, it is also possible to provide, in the assembly, a soluble and/or extractable substance which upon or after dissolution and/or extraction forms a foam layer in the liquid (example self-foaming creamer).

The sheet-shaped filter material can also consist of a small plate of, for instance, metal or plastic in which small openings have been provided. The sheet-shaped filter material can also consist of a net-shaped material provided with woven threads wherebetween openings are formed. Additionally, the assembly can be designed such that it can be opened. This may for instance be done by providing the top sheet so as to be removable. Then, after use, the assembly can be opened and refilled with the first and/or the second ingredient. The assembly can also be used in apparatus in which water is not supplied under pressure to the assembly (pouring water on).

In addition to being round, the assembly can also have other shapes such as a rectangular, square or oval shape.

Figure 8A:
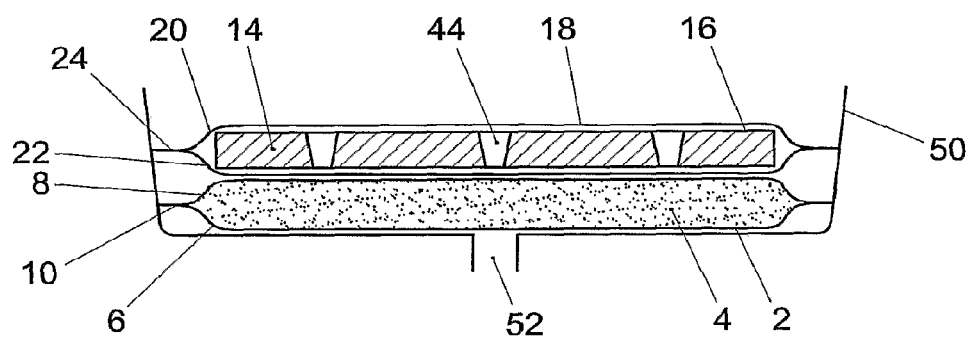
FIG. 8a shows across-section of an eighth embodiment of an assembly according to the invention, included in a holder.
Figure 8B:
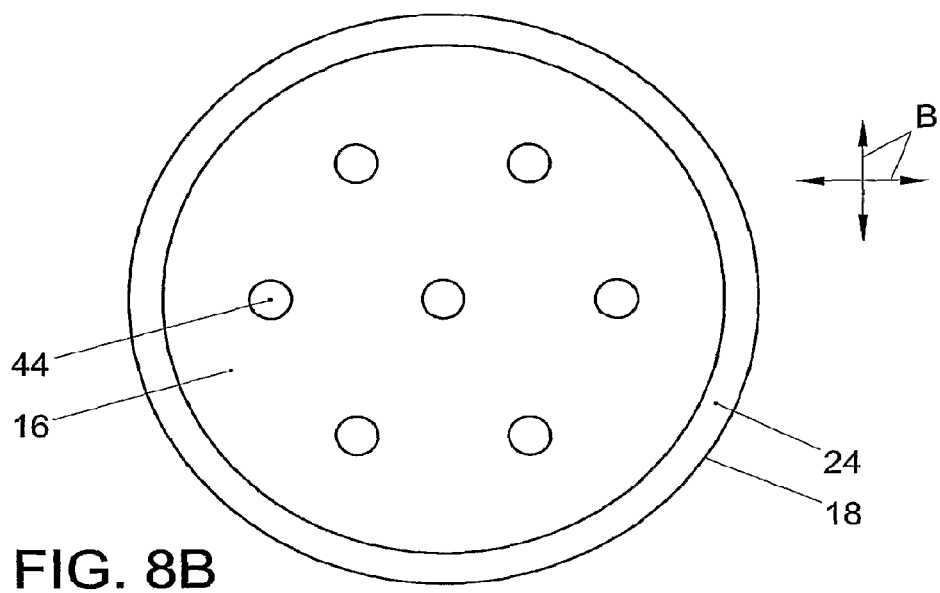

In particular, it further holds with the holder 50 and the first covering 1 as shown in FIGS. 8a and 8b, that for instance the holder 50 and the first covering 1 are interconnected before the substantially rigid body or the second covering 18 is placed in the holder. Here, it is preferred that the first covering and the holder are of integrated design. Therefore, it holds that the first covering is further provided with a holder with a receiving space for receiving the substantially rigid body or a second covering which is filled with a second ingredient such as ground coffee or tea, while the first covering is located beneath the receiving space and is in fluid communication with the receiving space. The first covering and the holder then form, for instance, a disposable holder. The second covering 18 too can be connected to the first covering 1 and/or the holder 50.

In each of the assemblies described with reference to, for instance, FIGS. 1, 3, 4, 5, 7, 8a and 8b, the top sheet of the second covering can be manufactured from a liquid-tight sheet, arranged such that it can be pulled away. In each of the assemblies described with reference to, for instance, FIGS. 1, 3, 6, 8a and 8b, the top sheet of the first covering can be manufactured from a liquid-tight sheet, arranged such that it can be pulled away. In the example described with reference to FIG. 2, the top sheet of the third covering can be manufactured from a liquid-tight sheet arranged such that it can be pulled away. The pull-away sheet can be removed before water is added to the assembly, when it is, for instance, placed in the holder 50. Here, it holds in particular that the at least one pull-away layer is tearable and is removed before placing the first covering in the holder and placing the second covering thereon or thereunder.

In use, the holder according to FIG. 8a can also take up other positions when water under pressure is supplied to the holder, for instance, the holder 50 can also stand on one side or upside down. It is also conceivable that other sorts of holders are used while the water is supplied to, for instance, a side or an underside of the holder. The first covering 1 can also be further characterized in that on the top sheet is provided a separating body with a number of passage openings, more particularly a water distribution plate such as a shower head plate. The passage openings can vary in number, position and (hydraulic) diameter. It is also possible that with the first covering, the top sheet and the bottom sheet form one and the same sheet. Here, the notion of top sheet and the notion of bottom sheet are not limited to two different sheets interconnected to each other. With the covering, other sheets too, or a single sheet can form a (fictitious) top sheet and bottom sheet. The bottom sheet can therefore also be a part of at least one sheet reaching to the upper side of the assembly. This holds completely analogously for the top sheet: this too may be partly formed from a sheet reaching to the underside of the assembly. All this holds also for the second covering.

In the examples, the first ingredient comprises the soluble substance, namely milk powder/creamer. Other soluble substances such as powder for cocoa and powder for obtaining other flavors and variants, or extractable substances are also conceivable. It is also conceivable that the substance has a different form from the powder form. The soluble substance may also comprise a concentrate and/or an extract. In the examples, the second ingredient comprises the extractable substance, that is ground coffee. Other extractable substances such as tea, or soluble substances are also conceivable. In the examples, the rigid body is obtained by compressing ground coffee. It is also conceivable that the substantially rigid body is obtained in an alternative manner, such as for instance by gluing ground coffee with a glue or gel suitable for consumption and which is preferably soluble in the liquid. Further, the top sheet and the bottom sheet of the first covering can also form, at their outside, a concave or convex surface. In that case, the top sheet 6 and the bottom sheet 8 are also at least substantially parallel to the plane 12. In each of the examples, it is possible too that the soluble substance 4 and the extractable substance 14 are interchanged. Here, the soluble substance 4 comes to lie above the product 14 to be extracted. It is also possible that the assembly is provided with several soluble substances and/or several extractable substances. It is also possible that the first and/or second ingredient comprises a substance which, after dissolution in the liquid, forms a foam. Here, it is possible that the substances to extract and/or the soluble substances are located both upstream and downstream of the soluble substances and/or substances to extract, respectively. The solubility of the soluble substances, when this is in powder form, can be further increased by agglomerating the powder. Such variants too are each understood to fall within the framework of the invention.

What is claimed is:

1. An assembly for preparing a beverage suitable for consumption, comprising:
   a supply side, for supplying, during use, a liquid to the assembly;
   a discharge side for discharging, during use, the beverage suitable for consumption of the assembly;
   a first covering and a first ingredient included in the first covering, the first ingredient, suitable as an additive, comprising one of a powder, a concentrate, and an extract soluble or extractable in the liquid; and
   a second ingredient comprising a substance soluble or extractable in the liquid,
   wherein the first ingredient forms part of a first body portion of a substantially rigid body,
   wherein only the second ingredient is glued with a glue or gel suitable for consumption, and forms part of a second body portion of the substantially rigid body,
   wherein the second ingredient is ground coffee, and
   wherein the second body portion of the substantially rigid body is provided with at least one through-flow opening, extending through the rigid body from a first side to a second side, with the first side and second side laying opposite each other.

2. The assembly of claim 1, wherein the first ingredient comprises a substance soluble in the liquid.

3. The assembly of claim 1, wherein the second ingredient comprises a substance to extract.

4. The assembly of claim 1, wherein the first ingredient is separated from the substantially rigid body.

5. The assembly of claim 1, wherein the first covering and the substantially rigid body are designed to be substantially relatively flat, and extend substantially parallel to each other.

6. The assembly of claim 5, wherein the first side, second side, the covering and the substantially rigid body extend substantially parallel to each other.

7. The assembly of claim 4, wherein the substantially rigid body is formed by at least the first and second ingredient in the compressed condition.

8. A method for preparing a beverage suitable for consumption using the assembly according to claim 1, wherein the assembly is placed in a holder which is provided with an inflow opening for a liquid, and an outflow opening for the beverage and wherein, thereupon, a liquid is supplied, under pressure, to the inflow opening of the holder so that the water flows from the supply side through the assembly for obtaining the beverage, whereupon the beverage leaves the assembly via the discharge side, whereafter the beverage is dispensed via at least one discharge opening of the holder.

9. The method of claim 8, wherein the first ingredient comprises a substance soluble in liquid, and wherein the liquid first flows through at least one through-flow opening to the soluble substance such that at least a part of the soluble substance dissolves and leaves the holder via the outflow opening, whereupon, the at least one through-flow opening is closed off so that the liquid is then pressed substantially through the substantially rigid body, thereby extracting the substance to extract, whereafter the thus obtained beverage, with a part of the soluble substance dissolved therein, leaves the holder via the outflow opening.

10. The method of claim 9, wherein the at least one through-flow opening is closed off in that the rigid body swells and/or dissolves under the action of the liquid.

11. An assembly for preparing a beverage suitable for consumption, the assembly comprising:
   a supply side configured to supply a liquid to the assembly;
   a discharge side configured to discharge the beverage suitable for consumption of the assembly;
   a first covering;
   a first ingredient included in the first covering, the first ingredient, suitable as an additive, comprising one of a powder, a concentrate or an extract soluble or extractable in the liquid;
   a second ingredient comprising a substance soluble or extractable in the liquid;
   wherein the first ingredient forms part of a first body portion of a substantially rigid body;

wherein only the second ingredient is glued, with a glue or gel suitable for consumption, and forms part of a second body portion of the substantially rigid body;

wherein the second ingredient is ground coffee; and wherein the second body portion of the substantially rigid body is provided with at least one through-flow opening, extending through the rigid body from a first side to a second side, with the first side and second side laying opposite each other.

12. The assembly of claim 11, wherein the first covering and the substantially rigid body are designed to be relatively flat, and extend substantially parallel to each other.

* * * * *